United States Patent [19]
Ericson

[11] 3,936,313
[45] Feb. 3, 1976

[54] METHOD OF PREPARING ADDITIVES FOR CALCIUM SULPHATE PLASTER

[75] Inventor: Bernt Sture Jörgen Ericson, Ornskoldsvik, Sweden

[73] Assignee: MoDoKemi AB, Stenungsund, Sweden

[22] Filed: Mar. 11, 1974

[21] Appl. No.: 450,033

[30] Foreign Application Priority Data
Mar. 14, 1973   Sweden .............................. 7303581

[52] U.S. Cl. ............... 106/197 R; 106/115; 106/315
[51] Int. Cl.² ...................... C08L 1/28; C04B 31/30
[58] Field of Search .................... 106/197, 315, 115; 260/232

[56] References Cited
UNITED STATES PATENTS

| | | | |
|---|---|---|---|
| 1,510,735 | 10/1924 | Baybutt | 260/232 |
| 2,118,663 | 5/1938 | Bradshaw | 260/232 |
| 2,698,254 | 12/1954 | Spurlin | 260/232 |

Primary Examiner—Theodore Morris

[57] ABSTRACT

A process is provided for preparing calcium sulphate plaster compositions having water-retaining and retarding characteristics, and comprising a water-soluble cellulose ether prepared by reacting cellulose mercerized with alkali hydroxide, and suitable reactants and a retarder. The mercerized cellulose still contains alkali impurities and an acid, the alkali salt of which is adapted to serve as calcium sulphate plaster retarder is added in an amount substantially equivalent to the amount of alkali hydroxide remaining in the cellulose ether.

Calcium sulphate plaster compositions also are provided as obtained by this process.

14 Claims, No Drawings

METHOD OF PREPARING ADDITIVES FOR CALCIUM SULPHATE PLASTER

When calcined gypsum (plaster of Paris) is used in the construction industry, it is usual to improve the properties of the calcium sulphate plaster by adding various substances in the preparation of the calcium sulphate plaster composition. Thus, it is common to add substances having a retarding action on the setting of the calcium sulphate plaster; such substances are referred to as retarders. Examples of such retarders are sodium salts of organic or inorganic acids. The addition of retarders is necessary, since otherwise setting of the plaster may occur too rapidly in as little as 5 minutes. The plaster should also exhibit good water retention, since this improves the workability and facilitates complete setting as well as increasing the strength of the plaster. This is of special importance for calcium sulphate plasters which are applied in such thin layers that quick drying occurs. As water retaining substances purified water soluble cellulose ethers are commonly used. The preparation of such cellulose ethers is relatively complicated, since it is necessary to remove from the cellulose ether any residues of sodium hydroxide introduced in the previous mercerization (causticization) of the cellulose, because any free sodium hydroxide present tends to degrade the cellulose ether. It is difficult to wash out sodium hydroxide from many cellulose ethers due to their having a high flocculating temperature, so that they can be purified only by means of using very hot water and/or organic solvents.

It has been found, in accordance with the present invention that the preparation of cellulose ethers for use in calcium sulphate plaster compositions can be simplified considerably by neutralizing the sodium hydroxide remaining from the mercerization of the cellulose by using an organic or inorganic acid, the alkali salt of which has retarding properties, without prior purification of the cellulose ether before such neutralization. If the acid is added in an amount of 95–105% of the amount stoichiometrically required for neutralization, a practically complete inhibition of the degradation of the cellulose ether is achieved. This has the advantage that the cellulose ether is storage stable without washing or other purification of the cellulose ether being required. Also, such cellulose ether then contains retarding substances which may completely or partly replace any addition of retarders. Thus, this method results in a utilization of the sodium hydroxide previously removed by washing (as such or as a salt) at the same time, but while a process step is eliminated. Since the washing step is unnecessary, it is also possible to use cellulose ethers which cannot be washed in hot water and have flocculating temperatures of 90°C. or above.

Accordingly, the present invention relates to a method of preparing a calcium sulphate plaster additive composition having water-retaining and retarding properties, said additive composition comprising (1) a water-soluble cellulose ether obtained by reacting cellulose mercerized with alkali hydroxide with suitable reactants, and (2) a retarding constituent. The method includes the step of adding to the resulting cellulose ether containing alkali hydroxide impurity, without prior purification of said cellulose ether to remove residual alkali hydroxide, an acid, the alkali salt of which serves as a calcium sulphate plaster retarder, in an amount approximately stoichiometrically equivalent to the amount of alkali hydroxide remaining from the reaction. In comparative tests made with a calcium sulphate plaster additive prepared in accordance with the present invention and a calcium sulphate plaster additive wherein the cellulose ether had been purified of alkali in the conventional way, and the retarding alkali salt had been prepared separately in a conventional manner and then dry blended, it was surprisingly found that the additive according to this invention dissolves considerably more rapidly in water which resulted in a more rapid distribution of the additive in the calcium sulphate plaster. The reason is not known, but it is believed that this effect is due to the fact that the additive obtained according to this invention is a homogeneous composition of water-retaining and retarding cellulose ether salt components.

The invention is applicable to any water-soluble cellulose ether commonly used in calcium sulphate plaster compositions, including water-soluble hydroxyalkyl cellulose ethers, alkyl cellulose ethers and alkyl hydroxyalkyl cellulose ethers. Examples of hydroxyalkyl cellulose ethers include hydroxyethyl cellulose and hydroxypropyl cellulose. The hydroxyalkyl cellulose ethers do not consume sodium in the addition of hydroxyalkyl groups to the cellulose chain. Examples of alkyl and alkyl hydroxyalkyl cellulose ethers include methyl cellulose, ethyl cellulose, propyl cellulose, methyl hydroxyethyl cellulose, ethyl hydroxyethyl cellulose, propyl hydroxyethyl cellulose, propyl hydroxypropyl cellulose, methyl hydroxypropyl cellulose and ethyl hydroxypropyl cellulose, as well as other water-soluble alkyl cellulose ethers and alkyl hydroxyalkyl cellulose ethers.

The amount of alkali hydroxide, usually sodium hydroxide, remaining in the cellulose ether prior to the neutralizing step, may, if desired, be controlled by the amount of alkali hydroxide used in the mercerization step and is preferably within the range from about 0.1 to about 10 parts per part of cellulose, on a weight by weight basis. If a particularly strong retarding action is desired, a supplementary addition of retarder may be made in a subsequent step. In principle, it is possible to use as a neutralizing acid any inorganic or organic acid, the alkali salts of which have a retarding action on the setting of calcium sulphate plaster. Exemplary acids include in particular phosphoric, sulfuric, boric, hydrochloric, acetic, formic, oxalic, adipic, maleic, malic, glutaric, butyric, trichloroacetic, propionic, succinic, lactic, tartaric, citric and gluconic acid, the sodium salts of which are excellent retarders. Preferred acids are phosphoric acid and succinic acid and especially citric acid.

The calcium sulphate plaster additive prepared by the method of this invention is usually added to the calcium sulphate plaster composition in an amount within the range from about 0.1 to about 5%, preferably from about 0.2 to about 0.5%, based on the weight of calcined sodium sulphate, the ratio by weight of the water-retaining cellulose ether to the retarder being within the range from about 20:1 to about 1:1.

In a particularly preferred embodiment of the present invention, the cellulose ether is hydroxyethyl hydroxypropyl cellulose or ethyl hydroxyethyl hydroxypropyl cellulose having a flocculating temperature above about 70°C, preferably above about 80°C. The preferred ether usually has an MS (molecular substitution) from about 0.5 to about 2 for hydroxyethyl, an MS of from about 1 to about 2 for hydroxypropyl, and a DS (degree of substitution) for ethyl from about 0.1 to about 0.4. These cellulose ethers which may be prepared by adding ethylene oxide and propylene oxide to the alkali mercerized cellulose, and then ethylating with ethyl chloride have been found to exhibit very good water retaining properties in calcium sulphate plaster compositions, and sodium hydroxide is not only to a small extent consumed during the addition reactions. This means that the sodium hydroxide added in the mercerization step can be utilized to a considerable extent to form retarding sodium salts in situ. The reason why hydroxyethyl hydroxypropyl cellulose and ethyl hydroxyethyl hydroxypropyl cellulose have such excellent water-retaining and working improving action is not known, but presumably it is related to the high tendency of aqueous sodium solution of these cellulose ethers to gel even at high solids contents.

Also, the calcium sulphate plaster additives in accordance with this invention impart to the calcium sulphate plaster composition a low adhesion to metal surfaces and a reduced tendency to flow.

The following Examples in the opinion of the inventor represent preferred embodiments of the invention.

EXAMPLE 1

Ethyl-hydroxyethyl hydroxypropyl cellulose, EHEHPC ($DS_{ethyl} = 0.15$; $MS_{hydroxyethyl} = 0.05$; $MS_{hydroxypropyl} = 1.8$) was produced by mercerizing 1 part by weight of cellulose with 20% aqueous sodium hydroxide for 30 minutes at room temperature. After the mercerization was complete, the cellulose was squeezed to a press factor of 2.5. The resulting 2.5 parts of alkali cellulose was shredded, after which it was transferred to an autoclave. Air was removed from the autoclave, and a reaction mixture comprising 1.5 parts of ethyl chloride, 1.4 parts of propylene oxide and 0.3 part of ethylene oxide was charged in the autoclave. After charging the temperature was raised to 70°C in 30 minutes and held at this level for 3 hours. The reaction was then stopped and the remaining ethyl chloride vented. One half of the resulting cellulose ether which had a flocculating temperature of about 65°C, was neutralized with 0.4 part of citric acid for 1 part of cellulose; then it was ground to form a slightly yellowish white and very loose powder.

The remainder of the cellulose ether was processed in a conventional manner by slurrying and washing the cellulose ether in hot water at about 95°C. The residue of alkali was neutralized with acetic acid. The produce was dried and ground in the same way as the product according to the invention, resulting in a relatively hard, greyish white and manifestly sintered product. Sodium citrate was mixed with the product in an amount corresponding to the amount of sodium citric in the product of this invention.

The two products were tested and compared with respect to their dissolving characteristics by dissolving 3 g. of each product in 147 g. of water at 20°C with mild agitation with a glass rod. The calcium sulphate plaster additive according to the invention dissolved with rapid increase in viscosity and was considered completely dissolved after about 30 minutes. The control product gave a relatively slow increase in viscosity. It was considered completely dissolved only after about 70 minutes.

The two products were also tested with respect to setting time measured according to Vicat (ASTM C-191-58) in a calcium sulphate plaster. The amount of water was 520 g. per 1000 g. of calcium sulphate. The following results were obtained.

TABLE I

| Amount of additive % by weight based on calcium sulphate plaster | Setting time, mins. | |
|---|---|---|
| | Initial | Final |
| 0.25% EHEHPC (including 0.03% Na citrate) (Example 1) | 92 | 107 |
| 0.22% EHEHPC + 0.03% Na citrate (control) | 30 | 45 |

It is seen from the setting times that the product prepared according to this invention exhibits a substantially longer setting time than the control product, although the amount of retarder is the same in both cases. The reason cannot be fully explained, but it is believed that a contributing factor is that the product according to the invention is rapidly dissolved and dispersed in the calcium sulphate plaster without forming gel lumps.

For comparison it may be mentioned that calcium sulphate plaster containing only washed cellulose ether (the EHEHPC ether of the control) has a setting time of about 5 minutes.

EXAMPLES 2 and 3

In a manner similar to Example 1, hydroxyethyl cellulose and hydroxypropyl cellulose were neutralized, without prior washing, with sufficient citric acid to neutralize sodium hydroxide present from the mercerizing step. The resulting products were added in varying amounts to calcium sulphate plaster the setting time of which was measured according to Vicat. The following results were obtained.

TABLE II

| | Amount of additive % by weight based on calcium sulphate plaster | Water, g. per 1000 g. calcium sulphate (to obtain normal consistency) | Added amount of acid (g.) per kg. cellulose for complete neutralization | Setting time, minutes | | Consistency |
|---|---|---|---|---|---|---|
| | | | | Initial | Final | |
| Hydroxyethyl cellulose $MS_{hydroxyethyl}=2.3$ (Example 2) | 0.1 | 500 | 563 | 21 | 26 | Good |
| | 0.2 | 490 | 563 | 46 | 51 | Good |
| | 0.3 | 470 | 563 | 63 | 74 | Good |
| Hydroxypropyl cellulose $MS_{hydroxypropyl}=3.75$ (Example 3) | 0.1 | 455 | 262 | 12 | 17 | Good |
| | 0.2 | 450 | 262 | 23 | 26 | Good |
| | 0.3 | 455 | 262 | 27 | 31 | Good |

The results show that the presence of cellulose ethers containing sodium citrate considerably increased the setting time of the calcium sulphate plaster. The setting time for a control composition without any additive was 5 minutes. Storage tests made with the compositions show that they also have excellent storage stability. This indicates that the sodium hydroxide present in the cellulose ether has been well neutralized.

EXAMPLE 4

Ethyl hydroxyethyl hydroxypropyl cellulose, EHEHPC ($DS_{ethyl} = 0.2$; $MS_{hydroxyethyl} = 0.5$; $MS_{hydroxypropyl} = 1.0$) was prepared according to the same method as in Example 1 by adding to cellulose mercerized with 20% aqueous sodium hydroxide, 1 mole of ethylene oxide and 2 moles of propylene oxide per mole anhydroglucose unit in the presence of ethyl chloride as a reaction medium. After alkoxylation was complete, phosphoric acid was added to the crude cellulose ether until the product was neutralized, after which it was ground. The effect of the resulting product on the setting of calcium sulphate plaster was tested, and the following results were obtained.

TABLE III

| Amount of additive % by weight based on calcium sulphate plaster | Water, grams per 1000 g. of calcium sulphate | Setting time, minutes Initial | Setting time, minutes Final | Consistency |
|---|---|---|---|---|
| 0.1 | 480 | 27 | 38 | Some Stiffening |
| 0.2 | 480 | 59 | 73 | Good |
| 0.3 | 480 | 75 | 100 | Good |

It appears from the data that phosphoric acid can be used advantageously for direct neutralization of crude cellulose ethers and that the resulting composition has a good retarding action on the setting of calcium sulphate plaster.

EXAMPLE 5

The cellulose ether prepared according to Example 1 was compared, as regards adhesion to iron surfaces, flowability and setting time, with conventional calcium sulphate plaster additives comprising dry blends of methyl hydroxyethyl cellulose (MHEC) and hydroxyethyl cellulose (HEC) with sodium citrate added separately and mixed therewith. The adhesion was determined by weighing the amount of plaster adhering to an iron plate which had been immersed for 5 seconds in the calcium sulphate plaster. Flowability was obtained by measuring the flow of a specific amount of calcium sulphate plaster according to ASTM C124-39. In all tests, the amount of water was 485 g. per 1000 g. of plaster. The following results were obtained.

TABLE IV

| Amount of additive, % by weight based on calcium sulphate plaster | Setting time, mins. Initial | Setting time, mins. Final | Flow mm. | Adhesion, grams, minutes after blending 1 | 2 | 3 | 4 | 5 | 10 | 15 | 20 | 25 |
|---|---|---|---|---|---|---|---|---|---|---|---|---|
| 0.25 EHEHPC (including 0.03% Na citrate) (Example 5) | 32 | 37 | 177 | 0.04 | 0.10 | 0.14 | 0.15 | 0.05 | 0.04 | 0.03 | 0.03 | 0.02 |
| 0.22 HEC + 0.03% Na citrate (control A) | 20 | 25 | 287 | 2.61 | 1.93 | 1.58 | 1.02 | 0.77 | 0.03 | 0.03 | sets | — |
| 0.22 MHEC + 0.03% Na citrate (control B) | 17 | 20 | 191 | 0.92 | 0.63 | 0.28 | 0.04 | 0.04 | 0.03 | sets | — | |

It is seen from the results that the sodium citrate-containing ethyl hydroxyethyl hydroxypropyl cellulose prepared according to this invention provides a considerably longer setting time than the conventional dry blends (control A and control B). Also, the product of this invention provides a comparatively small flow value which shows that the cellulose ether has an excellent thickening and water-retaining effect. Finally, the adhesion to metal surfaces of the product of this invention is low and clearly better than that of the controls. An adhesion of 0.25 gram or lower is acceptable in the test described, and the calcium sulphate plaster additives of this invention easily satisfy this requirement.

In the specification and claims all parts are by weight, unless otherwise indicated.

Having regard to the foregoing disclosures, the following is claimed as the inventive and patentable embodiments thereof:

1. A process for preparing calcium sulphate plaster compositions comprising a water-retaining and setting-retarding cellulose ether salt dissolving rapidly in water and modifying the setting and water-retaining characteristics of the composition, which comprises adding to a water-soluble cellulose ether containing residual alkali resulting from alkali mercerization of the cellulose prior to etherification, an acid the alkali salt of which serves as a calcium sulphate plaster setting retarder, in an amount approximately stoichiometrically equivalent to the amount of alkali hydroxide present in the cullulose ether, thereby neutralizing the alkali and forming said retarder salt in situ in a ratio by weight of the water-retaining cellulose ether to the retarder salt within the range from about 20:1 to about 1:1, and then adding the cellulose ether-retarder salt additive to a calcium sulphate plaster composition in an amount within the range from about 0.1 to about 5% based on the weight of calcium sulfate of the composition.

2. A process according to claim 1, in which the acid is selected from the group consisting of phosphoric acid, succinic acid, lactic acid, tartaric acid, citric acid and gluconic acid.

3. A process according to claim 1, in which the acid is an inorganic acid.

4. A process according to claim 1, in which the acid is an organic acid.

5. A process according to claim 1, in which the cellulose ether is a hydroxyalkyl cellulose ether.

6. A process according to claim 5, in which the hydroxyalkyl cellulose ether is hydroxyethyl cellulose.

7. A process according to claim 5, in which the hydroxyalkyl cellulose is hydroxypropyl cellulose.

8. A process according to claim 1, in which the cellulose ether is an alkyl cellulose ether.

9. A process according to claim 1, in which the cellulose ether is an alkyl hydroxyalkyl cellulose ether.

10. A process according to claim 9, in which the alkyl hydroxyalkyl cellulose is ethyl hydroxyethyl hydroxypropyl cellulose.

11. A process according to claim 9, in which the alkyl hydroxyalkyl cellulose ether is methyl hydroxypropyl cellulose.

12. A process according to claim 1, in which the cellulose ether is selected from the group consisting of methyl hydroxyethyl cellulose, hydroxyethyl cellulose, ethyl hydroxyethyl cellulose, methyl hydroxypropyl cellulose, ethyl hydroxypropyl cellulose, hydroxypropyl cellulose, hydroxyethyl hydroxypropyl cellulose and ethyl hydroxyethyl hydroxypropyl cellulose.

13. A process according to claim 1, in which the cellulose ether is selected from the group consisting of ethyl hydroxyethyl hydroxypropyl cellulose and hydroxyethyl hydroxypropyl cellulose having a flocculating temperature above 70°C.

14. A calcium sulphate plaster composition comprising calcium sulphate and a calcium sulphate plaster additive composition for modifying the setting and water retention characteristics of calcium sulphate plaster compositions and prepared in accordance with the process of claim 1.

* * * * *